(12) United States Patent
Rubin et al.

(10) Patent No.: US 9,142,239 B2
(45) Date of Patent: Sep. 22, 2015

(54) PATTERNED MAGNETIC STORAGE MEDIUM

(75) Inventors: Kurt A. Rubin, San Jose, CA (US); Manfred E. Schabes, Saratoga, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 505 days.

(21) Appl. No.: 13/332,206

(22) Filed: Dec. 20, 2011

(65) Prior Publication Data

US 2013/0155549 A1 Jun. 20, 2013

(51) Int. Cl.
*G11B 5/74* (2006.01)
*G11B 5/667* (2006.01)
*G11B 5/855* (2006.01)

(52) U.S. Cl.
CPC ............... *G11B 5/746* (2013.01); *G11B 5/667* (2013.01); *G11B 5/855* (2013.01)

(58) Field of Classification Search
None
See application file for complete search history.

(56) References Cited

U.S. PATENT DOCUMENTS

| | | | |
|---|---|---|---|
| 6,841,224 B2 | 1/2005 | Kamata et al. | |
| 7,670,696 B2 * | 3/2010 | Fullerton et al. | 428/834 |
| 7,867,406 B2 * | 1/2011 | Albrecht et al. | 216/22 |
| 8,383,253 B2 * | 2/2013 | Hinoue et al. | 428/827 |
| 2001/0006744 A1 * | 7/2001 | Saito | 428/694 TM |
| 2008/0292907 A1 * | 11/2008 | Berger et al. | 428/828 |
| 2009/0123660 A1 | 5/2009 | Inaba et al. | |
| 2009/0169731 A1 | 7/2009 | Albrecht et al. | |
| 2009/0214895 A1 | 8/2009 | Hinoue et al. | |
| 2009/0244777 A1 * | 10/2009 | Shimizu et al. | 360/234 |
| 2009/0244783 A1 * | 10/2009 | Shimizu et al. | 360/264 |
| 2009/0244785 A1 * | 10/2009 | Kikuchi et al. | 360/294 |
| 2009/0311558 A1 * | 12/2009 | Takeshita | 428/848.5 |
| 2010/0098873 A1 * | 4/2010 | Verhaverbeke et al. | 427/526 |
| 2010/0300874 A1 | 12/2010 | Kuo et al. | |
| 2011/0075297 A1 * | 3/2011 | Albrecht et al. | 360/135 |
| 2011/0101247 A1 | 5/2011 | Hilkene et al. | |
| 2011/0212270 A1 | 9/2011 | Uchida | |
| 2011/0244273 A1 * | 10/2011 | Mate et al. | 428/846.6 |
| 2012/0107646 A1 * | 5/2012 | Rawat et al. | 428/831 |

FOREIGN PATENT DOCUMENTS

| | | |
|---|---|---|
| JP | 2006286085 A | 10/2006 |
| JP | 2006309841 A | 11/2006 |
| JP | 2010218647 A | 9/2010 |
| WO | 2010058791 A1 | 5/2010 |
| WO | 2010095725 A1 | 8/2010 |

OTHER PUBLICATIONS

M. Aniya et al. "Magnetization Reversal Process of Hard/Soft Nano-Composite Structures Formed by Ion Irradiation" IEEE Transactions on Magnetics, pp. 2132-2135, vol. 46 No. 6, Jun. 2010.

* cited by examiner

*Primary Examiner* — Kevin Bernatz
(74) *Attorney, Agent, or Firm* — Kunzler Law Group, PC

(57) ABSTRACT

According to one embodiment, a patterned magnetic storage medium is disclosed herein. The magnetic storage medium includes a magnetic domain, a substantially non-magnetic region laterally adjacent to the magnetic domain, and an exchange spring structure disposed between the magnetic domain and the laterally adjacent non-magnetic region wherein the exchange spring structure comprises implanted ions.

15 Claims, 9 Drawing Sheets

500

| Species | Energy [keV] | Longitudinal Range [Angstrom] | Radial Straggle [Angstrom] |
|---|---|---|---|
| Sb | 5 | 30 | 15 |
| Sb | 15 | 55 | 25 |
| P | 5 | 42 | 29 |
| P | 10 | 71 | 49 | ns
PATTERNED MAGNETIC STORAGE MEDIUM

FIELD

This disclosure relates to magnetic storage media, and more specifically to physical and magnetic features in bit patterned magnetic storage media.

BACKGROUND

Patterned features in magnetic media are used for storing digital data that can be erased and rewritten. Patterned magnetic media is used in memory devices, such as magnetoresistive random-access memory (MRAM) and magnetic logic, and is being developed for use in storage devices, such as disk or tape drives. Patterned magnetic media on a disk or tape substrate can be referred to as bit-patterned magnetic media. In patterned magnetic media for storage devices, some of the patterned features are designed as storage elements of digital bits of data and other patterned features are designed for functions, such as providing servo information to position a read/write head.

Magnetic storage devices may store data in magnetic storage media by controlling the orientation of the magnetic field of a storage element. Writing techniques include generating a magnetic field through a storage element, which then induces a magnetic material (such as cobalt-based or iron-based particles, grains or domains) of the storage element to align with the induced magnetic field. When the induced magnetic field is removed, the alignment of the magnetic material of the storage element may remain. Reading techniques include various methods for measuring or sensing a magnetic orientation of the magnetic material of a storage element.

Generally, the magnetic material that is used to store data in disk drives and tape drives has adequately high magnetic moment density that can be reliably sensed by a read head. Highly magnetic materials have a large magnetic moment density, which promotes a strong and highly interactive magnetic field. Accordingly, magnetic materials with large magnetic moment densities generally make it easier to sense a magnetic orientation of the material because the field is easier to measure and/or sense.

Additionally, the magnetic material used to store data conventionally is a hard magnetic material. Hard magnetic materials tend to have a higher coercivity compared to softer magnetic materials. The higher coercivity of hard magnetic materials allows them to more stably maintain a magnetic orientation. Accordingly, using hard magnetic materials may allow a magnetic storage media to store data for long periods of time without refreshing or rewriting each bit of information. However, the high coercivity of a material may also make it more difficult to perform a write operation on the material. For example, in order to properly perform a write operation on a hard magnetic material, the magnetic field induced during a write operation may be required to have a higher magnitude or the induced magnetic field may be required to be applied for a longer period of time. Such additional requirements can lead to limitations on the areal density of magnetic elements formed in the medium because a higher magnitude magnetic field may affect nearby storage elements if the elements are too close to each other. Further, such additional requirements can also lead to slower write times because changing the magnetic orientation of a magnetic element with a magnetic field of a given amplitude may take longer.

Another challenge with patterned magnetic media is the reduced stability of the orientation of magnetic elements having smaller anisotropy and volume. Thermal affects alone, or in combination with static magnetic fields of neighboring storage elements, may induce smaller-sized magnetic elements that have low anisotropy to spontaneously change orientation. This results in the loss of stored information and loss of data. Because patterned magnetic media generally uses smaller and smaller portions of material for storing magnetic fields to increase storage density, the magnetic instability of a storage element becomes more and more of a limiting factor.

Several techniques are known for patterning bit-patterned magnetic media. Prior techniques relied on an etching process for forming the patterns of storage elements in data storage media. However, such techniques may require the planarization of the etched disk, which, if needed, result in increased cost and labor, as well as a reduction in yield. Accordingly, recently there has been a desire to develop certain techniques to mitigate the shortcomings of etching-based processes. For example, masked ion-beam and masked plasma immersion ion implantation lithography have proven to be an efficient alternative for producing patterned media.

SUMMARY

The subject matter of the present application has been developed in response to the present state of the art, and in particular, in response to the problems and needs in the art that have not yet been fully solved by currently available patterned magnetic storage media and/or methods of forming patterned magnetic storage media.

According to one embodiment, a patterned magnetic storage medium is disclosed herein. The magnetic storage medium includes a magnetic domain, a substantially non-magnetic region laterally adjacent to the magnetic domain, and an exchange spring structure surrounding the magnetic domain and disposed between the magnetic domain and the non-magnetic region. In one embodiment, the exchange spring structure includes implanted ions.

In one embodiment, the exchange spring structure includes a vertical portion. The exchange spring structure may separate the magnetic domain from substantially any portion of the non-magnetic region. The magnetic domain and the non-magnetic region may be formed substantially in a planar storage layer. The exchange spring structure may extend into the planar storage layer in a direction perpendicular to a surface of the planar storage layer. The exchange spring structure may include a substantially U cross-sectional shape.

In one embodiment, the patterned magnetic storage medium includes an exchange bridge. The exchange bridge may include a magnetic material that extends between the magnetic domain and one or more additional magnetic domains. The exchange bridge may include a homogenous exchange bridge layer. The exchange bridge may include a non-uniform exchange bridge layer. In one embodiment, at least a portion of the exchange spring structure extends into the non-uniform exchange bridge layer.

In one embodiment, the patterned magnetic storage medium includes two or more exchange bridges. The exchange bridges may include a magnetic material that extends between the magnetic domain and one or more additional magnetic domains.

In one embodiment, the magnetic domain includes a perpendicular magnetic storage material. In another embodiment, the magnetic domain includes a parallel magnetic storage material. In a further embodiment, the magnetic domain is included in a magnetoresistive random-access memory (MRAM) bit.

According to one embodiment, a method for fabricating a patterned magnetic storage medium is disclosed herein. The method may include fabricating a storage layer. The method may include fabricating a mask on the storage layer. The mask may include an opening to an exposed surface of the storage layer. The method may include implanting a first ion species into the exposed surface of the storage layer to form a first ion region. The method may also include implanting a second ion species into the exposed surface of the storage layer to form a second ion region. In one embodiment, the first ion species is different from the second ion species and the second ion region is contained within the first ion region.

In one embodiment, a material within the second ion region comprises magnetic properties different from the material within the first ion region but external to the second ion region. In one embodiment, the material within the first ion region comprises an exchange spring structure. The method may include implanting a third species into the exposed surface of the storage layer to form a third ion region. The method may include fabricating an exchange bridge layer. In one embodiment, implanting the first species includes implanting the first species with a first energy and a first dose and implanting the second species comprises implanting the second species with a second energy and a second dose. In one embodiment, the first dose may be different from the second dose. In one embodiment, the first energy is different from the second energy.

According to one embodiment, a magnetic disk drive system is disclosed. In one embodiment, the magnetic disk drive includes a controller module, a suspension arm, a read/write head, and a magnetic storage disk. The magnetic storage disk may include a planar storage layer. In one embodiment, the planar storage layer includes a magnetic domain, a substantially non-magnetic region surrounding (e.g., laterally adjacent) to surrounding the magnetic domain, and an exchange spring structure disposed between the magnetic domain and the laterally adjacent non-magnetic region. In one embodiment, the exchange spring structure includes implanted ions.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
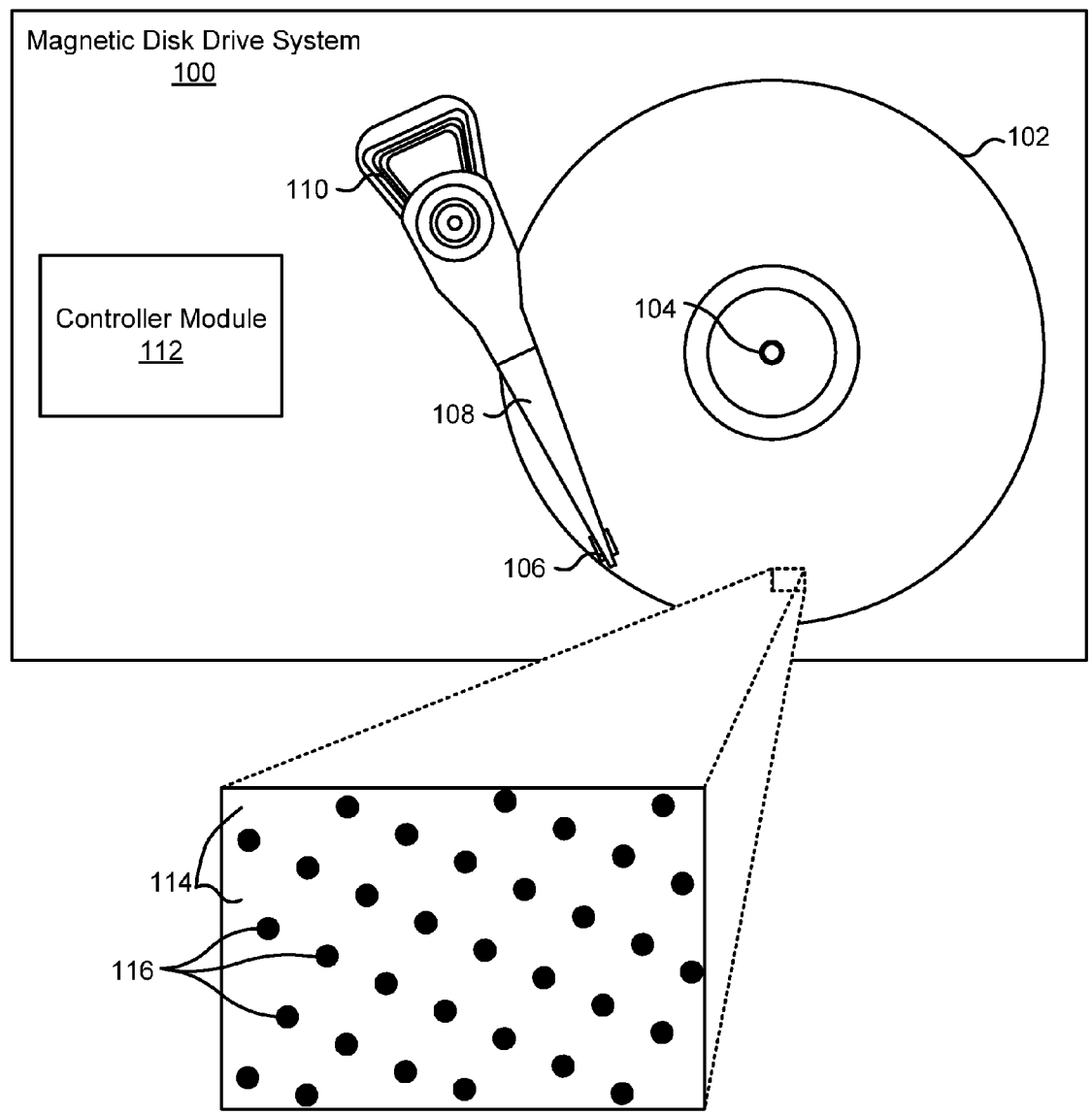
FIG. 1 is a schematic illustration of one embodiment of magnetic disk drive system.

FIG. 1 is a schematic diagram illustrating one embodiment of a magnetic disk drive system 100. In the depicted embodiment, the magnetic disk drive system 100 includes a magnetic storage disk or disks 102, a spindle 104, a read/write head 108, a suspension arm 108, an arm actuator 110, and a controller module 112.

The disk 102 can be defined as a magnetic storage medium that includes magnetic material for magnetically storing information. The spindle 104 allows the disk 102 to rotate about an axis defined by the spindle 104. The read/write head 106 is mounted on the suspension arm 108, which is connected to the arm actuator 110. The arm actuator 110 actuates the position of the suspension arm 108 and, in conjunction with the rotation of the disk 102 about the spindle 104, physically actuates the location of the read/write head 106 in relation to the surface of the disk 102. In a write mode, the read/write head 106 induces a magnetic field that changes the magnetic orientation of a portion of the disk 102. In a read mode, the read/write head 106 reads information from the disk 102 by measuring or sensing an orientation of the magnetic fields of different portions of the storage media. The controller module 112 controls the arm actuator 110, the read/write head 106, and the rotational speed and position of the disk 102 to perform reading, writing, and other operations.

In one embodiment, the disk 102 includes a rigid substrate and storage elements for magnetically recording and/or storing data. The storage elements may be near a surface of the disk 102 such that the information stored by the elements can be read or information can be written to the elements by the read/write head 106. In one embodiment, the storage elements include a plurality of magnetic domains 116 defined between a plurality of non-magnetic regions 114. The disk 102 with a pattern of magnetic and non-magnetic regions may be referred to as a bit patterned medium.

The magnetic regions or domains 116 may each correspond to a single bit of data storage. For example, if the material (e.g., grains) of a magnetic domain 116 is magnetically oriented in a first general direction, the magnetic disk drive system 100 may read that bit as a zero '0'. In contrast, if the material of the magnetic domain 116 is magnetically oriented in a second general direction generally opposite the first general direction, the magnetic disk drive system 100 may read the bit as '1'. In one embodiment, the magnetic grains of each of the magnetic domains 116 may be magnetically oriented in a direction perpendicular or parallel to a surface of the disk 102. The non-magnetic regions 114 may be non-magnetic or substantially non-magnetic such that little or no magnetization may be written in the non-magnetic region, or little or no magnetic field may be read from the non-magnetic region 114.

Although the system shown in FIG. 1 is a magnetic disk drive system with a data storage disk, in other embodiments, other types of magnetic storage systems with various data storage media may also be used. For example, some embodiments may include systems that utilize magnetic tape drive media or magnetoresistive random-access memory (MRAM). Although the present subject matter is presented largely in relation to magnetic disk drives and/or a read/write head of a magnetic disk drive, the present subject matter is applicable to all patterned media. For example, one of skill in the art will recognize the applicability of the present subject matter to magnetic tape drive media and associated read/write heads as well as MRAM media and associated write lines and read lines.

Figure 2A:
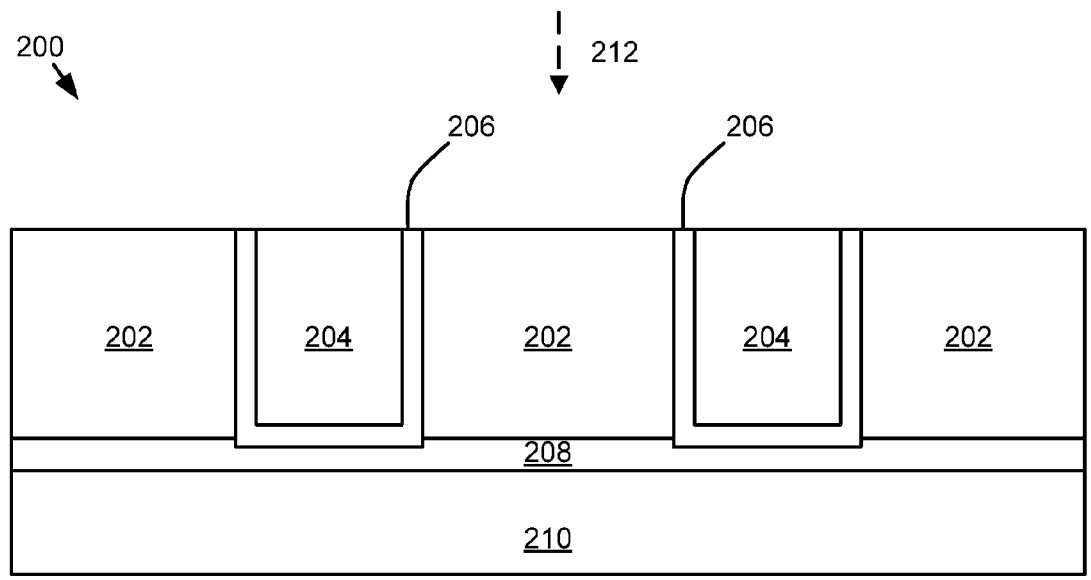
FIG. 2A is a schematic cross-sectional side view of a portion of a patterned magnetic storage medium according to one embodiment.

FIG. 2A is a schematic diagram illustrating a cross-sectional structure of a magnetic storage medium 200, which is exemplary of various types of magnetic storage media. The medium 200 includes magnetic domains 202, non-magnetic regions 204, exchange springs 206, an exchange bridge 208, and a substrate 210. The structures 202-210 are exemplary only and may not all be included in all embodiments. Note that FIG. 2A is a schematic diagram and does not represent the actual physical structure of the components 202-210. For example, the structures may not have clearly defined boundaries or may include rounded corners and/or lines. One of skill in the art will recognize that the actual structure may vary depending on fabrication methods, materials, etc.

Each of the magnetic domains 202 may be used to store data by maintaining its magnetic materials (e.g., grains) in a certain magnetic orientation that can later be read by a read/write head. In one embodiment, a magnetic domain 202 in an MRAM media may cause the electrical properties of a material to change. For example, in one embodiment, if the magnetic domain 202 is oriented in a first direction the resistance of an MRAM cell may be increased while if the magnetic domain 202 is oriented in a second direction the resistance of an MRAM cell may be decreased.

In one embodiment, each magnetic domain 202 represents a single bit of data. For example, each magnetic domain may represent a single '1' or '0' for data stored in a storage medium. In one embodiment, the magnetic domain 202 may include a hard magnetic material particularly conducive to maintaining its orientation to promote a static magnetic field that may be read. The magnetic domain 202 may be highly magnetic and have a high magnetic moment density such that the magnetic orientation of the magnetic domain may be easily read.

The medium 200 may include one or more non-magnetic regions 204. The non-magnetic regions 204 may be substantially non-magnetic such that they interact only very weakly with magnetic fields or not at all. In one embodiment, the non-magnetic regions 204 may separate each magnetic domain 202 from other magnetic domains 202. In one embodiment, the non-magnetic regions 204 may make it easier to read an orientation of a magnetic domain 202. For example, if a non-magnetic region 202 is substantially non-magnetic, there may be a reduced amount of noise detected by a by a read/write head when the head is over the non-magnetic region 204. This may make it easier to identify the magnetic domains 202 when passed over by a read/write head.

The medium 200 includes one or more exchange springs 206. Each exchange spring 206 is a region which enables a read/write head to more easily and/or quickly change a magnetic orientation of a magnetic domain 202. For example, the magnetic properties of an exchange spring 206 may reduce the strength of a magnetic field or the amount of time necessary to change (e.g., switch) the magnetic orientation of a magnetic domain 202.

In one embodiment, the use of an exchange spring 206 may increase the allowed hardness or coercivity of a magnetic domain 202. In one embodiment, the coercivity for magnetic domains 202 may be chosen to provide sufficient thermal stability while still being writable by the write head field. Higher coercivities result in a magnetic domain that may be more stably held a determined magnetic orientation. However, higher coercivities may make it more difficult for a write head to change the stored magnetic orientation. The use of an exchange spring 206 not only promotes higher magnetic orientation stability, but also lessens the difficulty for changing the magnetic orientation when desired. For example, a maximum coercivity of a magnetic domain 200 which still allows for writing to the magnetic domain by a particular write head may be approximately 6,000 Oe without an exchange spring 206. However, the same write head may be able to write to a magnetic domain 202 having a coercivity of 10,000 Oe with an exchange spring 206. Because an exchange spring 206 enables the use of magnetic domains 202 with higher coercivities, higher stability of the magnetic domains and stored data is obtainable.

In one embodiment, the exchange springs 206 may be regions of the medium 200 made from a material that has a coercivity less than the material of the magnetic domains 202. For example, the material forming the exchange springs 206 may be such that the magnetic orientation of the exchange springs 206 may be easier to change than the magnetic orientation of the magnetic domains 202. In one embodiment, the exchange springs 206 may be made from a soft magnetic material that interacts with a magnetic field, but may not independently maintain magnetic orientation. For example, the exchange springs 206 may have a medium or high magnetic moment density with a medium or low coercivity.

In one embodiment, the exchange springs 206 may have a magnetic moment density higher than a non-magnetic region 204 but lower than a magnetic domain 202. Magnetic moment densities of exchange springs 206 may vary considerably. In one embodiment, an exchange spring 206 may have a magnetic moment density from about 500 to about 1700 emu per cubic centimeter (emu/cc). Similarly, the coercivity for an exchange spring 206 may also vary.

In one embodiment, the coercivity of a material may be varied based on the composition of the material and/or dopants within the material. For example, one embodiment of a magnetic hard layer (high coercivity) may be an alloy that includes Cobalt (Co), Chromium (Cr), Platinum (Pt) and suitable dopants. Exemplary suitable dopants include, but are not limited to, one or more of Boron (B), Tantalum (Ta), Silicon (Si), Silicon dioxide ($SiO_2$), Carbon (C), and other dopants. In one embodiment, a magnetic soft layer (low coercivity) may be an alloy similar to a magnetic hard layer but may have a composition and microstructure tuned to have a lower coercivity. For example, the coercivity may be reduced by reducing the Pt content of the alloy and/or increasing the Cr and/or Co content. One of skill in the art will recognize that the above discussed hard and soft layers are exemplary only, and also will recognize that other alloy components, dopants, and variations can be used to control the coercivity of a material.

In one embodiment, the exchange springs 206 promote a reduction in the time and/or strength of the magnetic field necessary to change the magnetic orientation of a magnetic domain 202. In one embodiment, the magnetic material of the exchange springs 206 reorients easier to better reflect an external magnetic field compared to a magnetic domain 202, for example due to a lower coercivity. The easier reorientation of the exchange springs 206 facilitates magnetic orientation switching of the magnetic domains 202 to better reflect the external magnetic field.

The exchange bridge 208 of the medium 200 is a region that facilitates magnetic communication (ferromagnetic exchange interaction) between two or more of the spaced-apart magnetic domains 202 of the medium. In one embodiment, the exchange bridge 208 increases the thermal stability of the magnetic domains 202 by introducing ferromagnetic exchange interaction between magnetic domains 202. In one embodiment, the exchange bridge 208 facilitates a reduction of unwanted magnetostatic interaction between two or more of the spaced-apart magnetic domains 202 of the medium by introducing a counteracting exchange coupling. In one embodiment, the ability of the exchange bridge to allow ferromagnetic exchange interaction between two regions increases with the exchange bridge's 208 cross-sectional area and the intrinsic exchange constant of the material. For example, some materials may have a higher exchange constant and may allow for greater ferromagnetic exchange interaction. The exchange bridge 208 includes magnetic material that extends between two or more magnetic domains 202. The exchange bridge 208 may be made from hard or soft magnetic material.

The substrate 210 may be a non-magnetic material that supports the recording medium 200. The substrate may be made from any of various materials, such as, for example aluminum, aluminum alloys, polymers, Mylar, paper, glass, glass composites, magnesium alloys, ceramics, silicon, silicon wafers coated with one or more material layers, or other materials commonly used in the art. In certain implementations, the substrate 210 is a flexible tape substrate. In other implementations, the substrate 210 is a hard disk substrate. Although FIG. 2A show an exchange bridge build directly on the substrate 210, some embodiments may include one or more underlayers disposed on the substrate 210 between the magnetic domains 202 and the substrate 210.

In one embodiment, the recording medium 200 may include a soft underlayer. In one embodiment, the soft underlayer may be disposed below the magnetic domains 202 and/or the exchange bridge 208. In one embodiment, a soft underlayer may be formed of a material that is magnetically softer (lower coercivity) than a magnetic domain 202. In one embodiment, a soft underlayer may be much thicker than an exchange bridge 208. For example, in one embodiment, the exchange bridge 208 may have a thickness between 0.5 to 2.0 nanometers (nm) while the soft underlayer be several nm thick, e.g. 5-50 nm depending on the size of the write head pole and the flux emanating from it. In one embodiment, the soft underlayer may be disposed between the exchange bridge 208 and a substrate 210. Additionally, as is well-known in those skilled in the art, an exchange-break layer of non-magnetic materials (e.g. Ru) of thickness 2-50 nm may be disposed on top of the soft underlayer to decouple the magnetic domains 202, or the exchange bridge 208, if present, from the soft underlayer. In one embodiment, a soft underlayer may be formed of the same or a different material than an exchange bridge 208. In one embodiment, one or more of the soft underlayer and/or an exchange bridge may be formed of Co, NiFe or any other suitable alloys such as CoPtCr which are well known in the art.

In one embodiment a soft under layer increases the available write flux and field gradients for the write process. That is, a soft underlay may increase the possible field strength and field gradient of a write field that may be used in a write process. Higher field strengths and higher field gradients enable writing sharper magnetic transitions and may be needed or desired for magnetically reversing smaller sized magnetic bits (such as in bit patterned media) that are thermally stable. The soft underlayer may also be useful because it may help reduce the affects of adjacent track interference (ATI) during a read and/or write process.

Figure 2B:
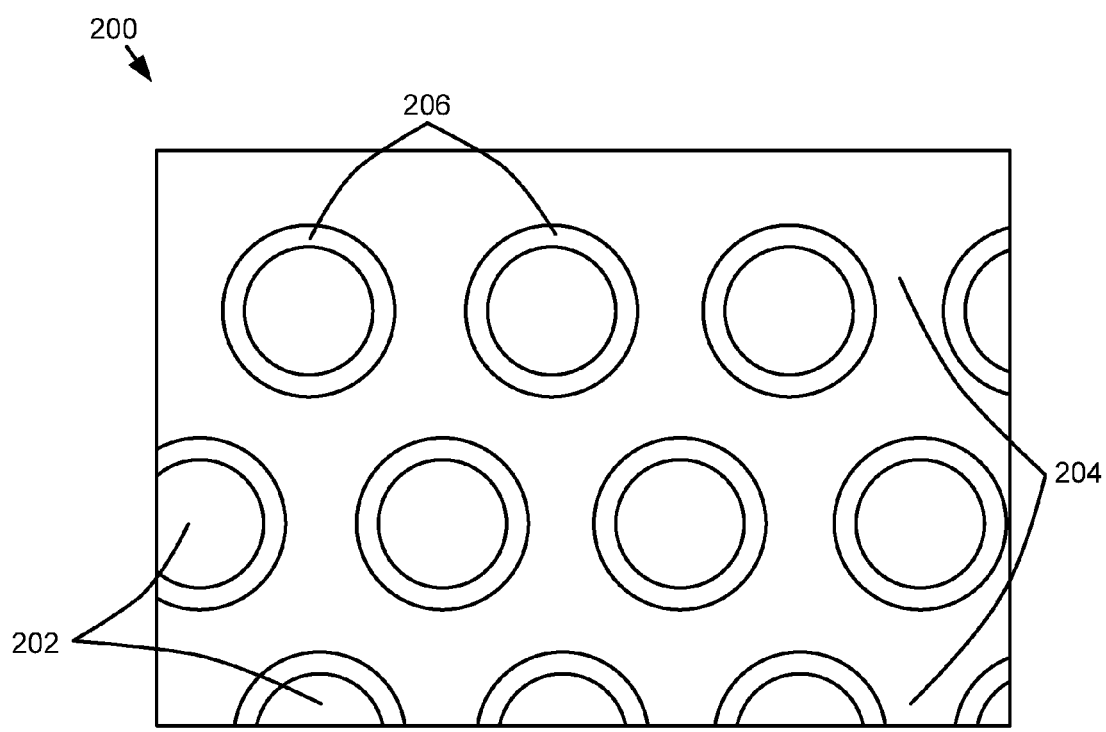
FIG. 2B is a schematic plan view of a portion of a patterned magnetic storage medium according to one embodiment.

FIG. 2B is a plan view of the magnetic storage medium 200 of FIG. 2A. In one embodiment, the magnetic domains 202 are surrounded by the non-magnetic regions 204. The non-magnetic regions 204 may be laterally adjacent to the magnetic domains 202. In the embodiment associated with FIG. 2B, the exchange springs 206 separate the magnetic domains 202 from the non-magnetic regions 204. In one embodiment, the exchange springs 206 surround all or a substantial portion of the sides of the magnetic domains 202. In one embodiment, because the exchange springs 206 surround the sides of the magnetic domains 202, the springs have a high amount of surface area in contact with the magnetic domains, which promotes a significant reduction in the requirements (e.g., amplitude and application time of a magnetic write field) for writing to the magnetic domains 202. For example, because of the effects of the exchange springs 206, a lower magnitude magnetic field amplitude and/or a smaller period of time may be sufficient enough to adequately change the magnetic orientation of the magnetic domains 202.

Note that although FIGS. 2A and 2B have been described above as having coercivities and/or magnetic moment densities at a minimum in regions 204 and at a maximum in regions 202, this may be reversed in some embodiments. For example, in one embodiment, the regions 202 may have a minimum coercivity and/or magnetic moment density while regions 204 may have a maximum coercivity and/or magnetic moment density. In one embodiment, the exchange spring of layer 406 may still have a coercivity and/or a magnetic moment density between those of regions 202 and 204.

Figure 3:
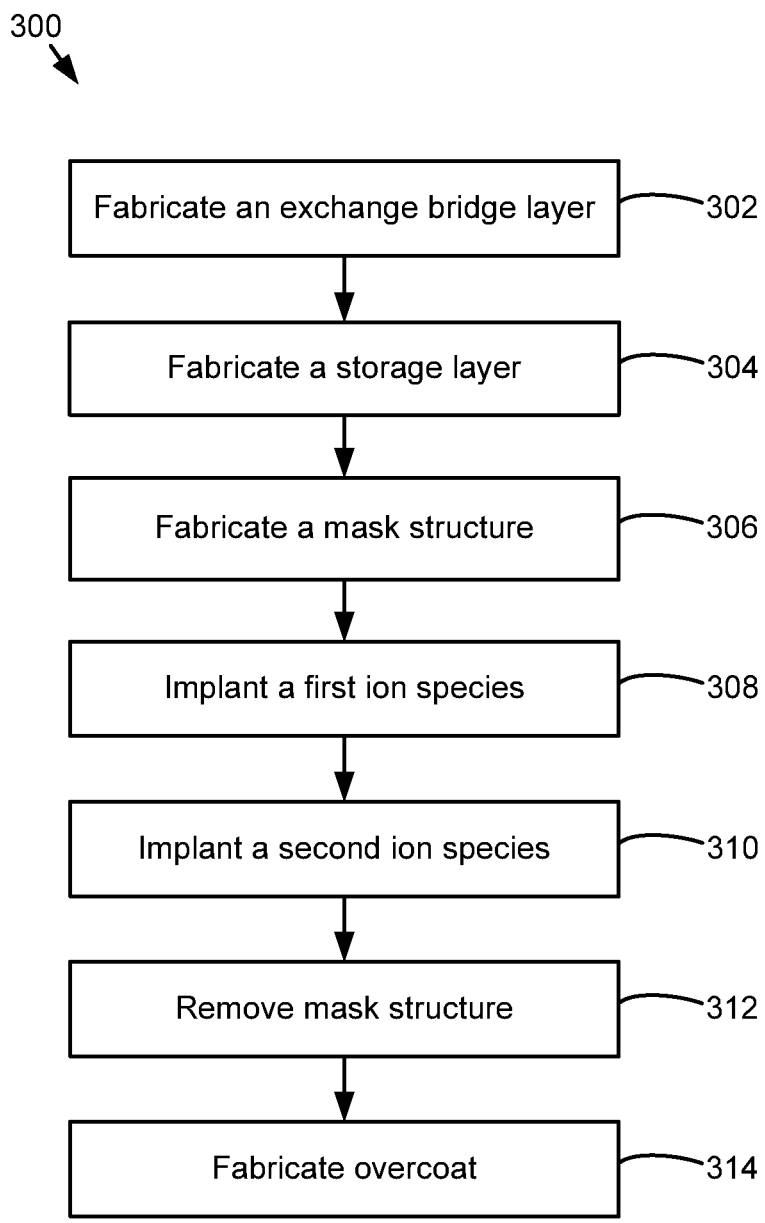
FIG. 3 is a flow chart diagram illustrating a method for fabricating a magnetic storage medium according to one embodiment.

FIG. 3 is a schematic flow chart diagram illustrating one embodiment of a method 300 for fabricating a magnetic storage medium. Generally, the method 300 involves tuning the magnetic properties of a magnetic storage layer or other material to form a bit patterned magnetic storage medium using two or more ion implantation steps. The method 300 may be used, for example, to form the magnetic storage medium 200 of FIGS. 2A and 2B. Exemplary operation of the method 300 will be discussed in relation to FIGS. 4A-4F.

In the illustrated embodiment, the method 300 includes fabricating 302 an exchange bridge layer 302. The exchange bridge layer may be fabricated 302 (e.g., deposited) on top of a substrate or an underlayer. The underlayer may be a magnetic soft underlayer, a magnetically hard underlayer, or any other type of layer. Additionally, a non-magnetic exchange-break layer may be disposed on top of the soft underlayer, as is well-known in the art. The exchange bridge layer may be fabricated 302 using any of various deposition techniques known in the art. For example, the exchange bridge layer may be fabricated at 302 using chemical vapor deposition, sputter deposition, or any other thin film fabrication methods known in the art.

Figure 4A:
FIGS. 4A-4F each illustrates a respective stage of a magnetic storage medium during a fabrication process according to one embodiment.
Figure 4B:
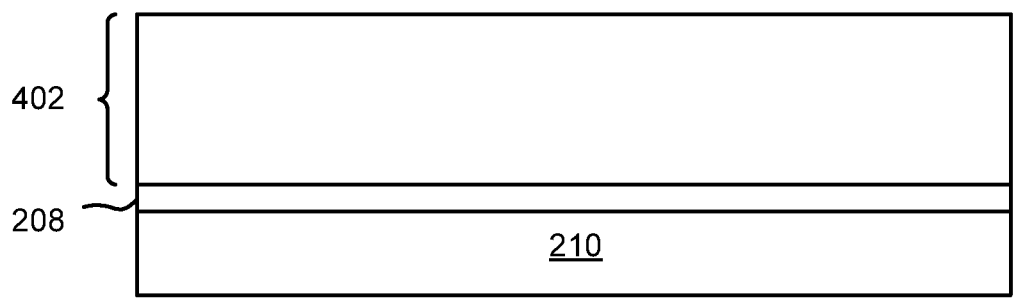

The method 300 also includes fabricating 304 a magnetic storage or recording layer. The magnetic storage layer may be fabricated 304 on the exchange bridge layer, substrate, or an underlayer. FIG. 4A illustrates the substrate 210 and FIG. 4B illustrates the medium after the fabrication 302 of the exchange bridge layer 208 onto the substrate 210, and the fabrication 304 of the storage layer 402 onto the exchange bridge layer. The substrate 210 depicted is exemplary only and does not necessarily reflect an actual substrate thickness in relation to the exchange bridge layer 208 and the storage layer 402. For example, substrates will generally be extremely thick in comparison to thin film exchange bridge layers 208 and storage layers 402. Thus, one of skill in the art will recognize that the thickness of the illustrate substrate 210 can vary considerably and should not be understood as limiting.

The storage layer 402 is a relatively thin film made from a magnetic material, such as, for example, any of various ferromagnetic materials, iron, cobalt, cobalt, chromium, platinum, palladium, nickel, alloys of the same (e.g., alloys including oxygen, boron, silicon, carbon, and the like), or other materials commonly used in the art.

The storage layer 402 may be fabricated 304 using any method known in the art, such as, for example, chemical vapor deposition, sputter deposition, and any other thin film fabrication method known in the art. In one embodiment, the storage layer comprises a perpendicular storage material. For example, the material of the storage layer fabricated 302 in the method 300 may include a material that is more easily magnetized in a direction perpendicular to a surface of the storage layer. In one embodiment, the storage layer comprises a parallel or longitudinal storage material. For example, the material of the storage layer fabricated 304 in the method 300 may include a material that is more easily magnetized in a direction parallel to a surface of the storage layer.

Figure 4C:
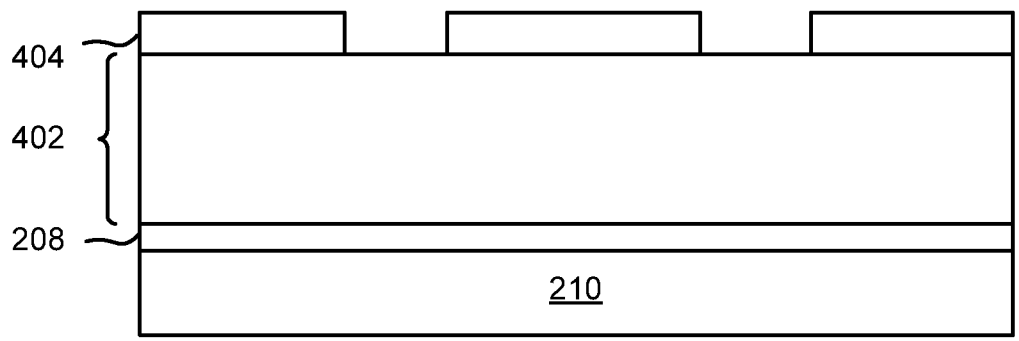

The method 300 further includes fabricating 306 a mask structure. As shown in FIG. 4C, a mask structure 404 has been fabricated 306 on the storage layer 402. The mask structure may be formed using one or more deposition and etching steps. In one embodiment, the mask structure may be formed by depositing a glass layer on the storage layer, exposing the glass to electromagnetic waves, and etching away a portion of the glass layer. In varying embodiments, the portions of the glass layer that are etched away correspond to non-magnetic regions. In other words, the etched portions of the mask expose regions of the magnetic storage layer that will be converted into less magnetic or non-magnetic regions via ion implantation while portions of the mask that cover regions of the magnetic storage layer may be magnetically isolated and become magnetic domains.

Following fabrication 306 of the mask structure, the method 300 includes implanting 308 a first ion species into the exposed regions of the magnetic storage layer. Implanting 308 the first ion species includes directing the first ion species towards a mask structure and exposed portions of a storage layer. In one embodiment, the first ion species is implanted 308 into portions of the storage layer 402 not masked by the storage structure 404. As shown, the first ion species implant into the exposed portions of the storage layer 402 to change a magnetic property of the exposed portions. Generally, implantation of the first ion species into the exposed portions reduces, and in some cases eliminates, the magnetic properties of the exposed portions. The type, energy, duration, and doping rates of the first ion species is selected to control the magnetic characteristics (e.g., coercivity and/or magnetic moment density) and the spatial characteristics (e.g., depth and width) of the non-magnetic or exposed regions of the storage layer.

Generally, the implanted ions act to demagnetize the exposed portions of the storage layer 402 or render the exposed portions less magnetic. Because the covered portions of the storage layer 402 are covered by the hard mask 404 the first ion species is not embedded in the covered portions. Accordingly, the covered portions retain their magnetic properties and remain magnetized. In this manner, the ionization of the patterned exposed portions of the storage layer 402 form a patterned series of magnetic domains 410 in the storage layer 402.

The first ion species can be made up of any of various types of ion species, such as, for example, antimony, nitrogen, oxygen, chromium, neon, argon, fluorine, boron, phosphorus, tungsten, arsenic, hydrogen, helium, carbon, silicon, and the like. In certain implementations, and to reduce lateral straggle of the implant species within the magnetic layer, the ions 50 are made up of higher mass implant species, such as, for example, high density antimony, arsenic, germanium, bismuth, krypton, xenon, and the like.

After implanting ions into the non-magnetic portions of a magnetic layer, additional processes may be performed to further implant the ions or secure/lock the implanted ions within the magnetic layer. For example, any of various additional steps known in the art, such as, for example, a flash anneal process, thermal anneal process, furnace process, and the like.

Generally, at least one of ions with higher energy, ions with higher masses, implanting at higher doping rates, and implanting for longer durations correspond to a greater implantation depth ("longitudinal range") of the implanted regions and/or the lateral spread of the implanted regions beyond the lateral confines of the openings in the mask ("radial straggle").

Longitudinal range and radial straggle may be of importance because they determine the size and/or shape of an implanted region. For example, longitudinal range determines whether or not the first regions 406 will extend into an exchange bridge layer 208, substrate 210, or an underlayer. Radial straggle determines how wide an implanted region will be. For example, the radial straggle may determine how far underneath a mask layer a resulting implanted region may extend.

Figure 4D:
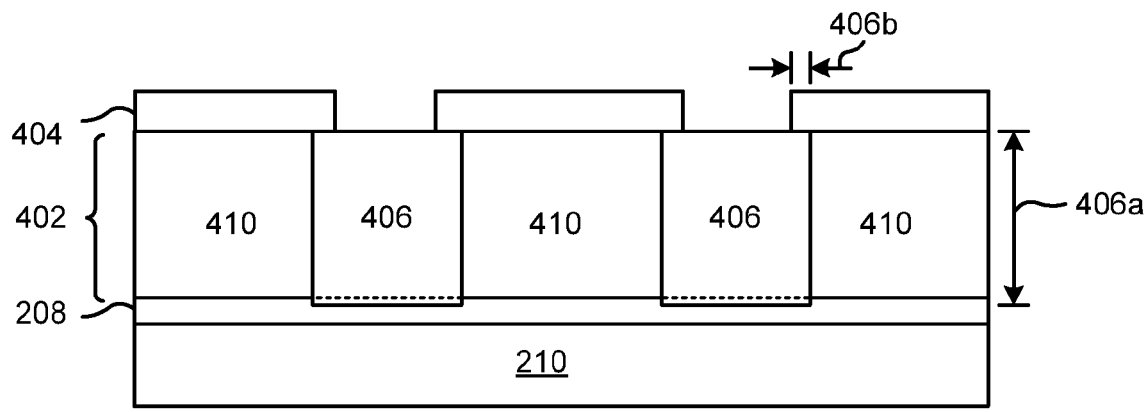

FIG. 4D illustrates a plurality of first regions 406 in which the first ion species has been implanted 308. The dotted lines within the first regions 406 indicate where the first region extends into the exchange bridge layer 208. Dimension 406a illustrates the longitudinal range of the first species implanted in region 406. Dimension 406b illustrates the radial straggle of the first species implanted in region 406. Also illustrated are magnetic domains 410 that have been formed between the first regions 406.

Referring back to FIG. 3, the method 300 includes implanting 310 a second ion species after implanting 308 the first species. Implanting 310 the second ion species includes directing the second ion species having a second energy towards a mask structure and/or storage layer. Once again, the type, energy, duration, and doping rates of the second ion species is selected to control the magnetic characteristics (e.g., coercivity and/or magnetic moment density) and the spatial characteristics (e.g., depth and width) of the non-magnetic or exposed regions of the storage layer. In one embodiment, at least one of the species type, energy, duration, and doping rate of the second ion species is different than for the first ion species.

In one embodiment, the second ion species may pass into storage layer 402 to change a magnetic property of at least a portion of the storage layer 402. In one embodiment, the second ion species is implanted 308 into portions of the storage layer 402 not masked by the storage structure 404. In one embodiment, the second ion species is implanted 308 wholly within the first region 406 containing the implanted first ion species. In other words, the second ion species are implanted into the first non-magnetic regions 406 to form a second non-magnetic or less magnetic regions contained within the first regions. In one embodiment, the portion of the storage layer 402 that receives implanted 310 ions is determined at least in part by the type of species and the energy of the species. For example, higher energy may correspond to a greater longitudinal range and/or radial straggle. In one embodiment, the second ion species is implanted 310 such that it has a smaller longitudinal range and smaller radial straggle than the implanted 308 first ion species.

In one embodiment, following first and second ion implantation steps the magnetic domains 410 have an original coercivity (K0) and an original magnetic moment density (dM0), the first regions 406 have a first coercivity (K1) and first magnetic moment density (dM1), and the second regions 408 have second coercivity (K2) and a second magnetic moment density (dM2). In one embodiment, each successive ion implantation is selected to result in decreased magnetic moment density and or coercivity. For example, the ion species type, energy, duration, and doping rates of the first and second ion implantations may be selected such that the original coercivity (K0) is greater than the first coercivity (K1) and the first coercivity is greater than the second coercivity (K2). In other words, the coercivity of storage layer 402 may decrease from magnetic domains 410 to the second region such that K0>K1>K2. In one embodiment, the second coercivity (K2) may be approximately zero. In one embodiment, the reduced coercivity and/or magnetic moment density may be a result of decreased anisotropy.

In one embodiment, each successive ion implantation is selected to result in increased anisotropy of implanted regions. For example, the ion species type, energy, duration, and doping rates of the first and second ion implantations may be selected such that the anisotropy of the magnetic domains 410 is less than the anisotropy of the first regions 406 and the anisotropy of the first regions 406 is less than the anisotropy of the second regions 406.

The implanted ions may change the magnetic properties of a region of material (coercivity, anisotropy, and/or magnetic moment density) via a number of mechanisms. One of the properties of the ion species that leads to a reduction of coercivity is the disorder produced by the ion species. As the ions traverse thru the magnetic region, the atoms of the magnetic region are disrupted and moved from their original position into a new position. This can lead an initially substantially crystalline region to become filled with defects or with high doses of implant species to become amorphous. The change of microstructure can result in changed bonding characteristics and local modifications to the band structure to render the material non-magnetic or substantially less magnetic. A second way in which ion species can lead to reduced coercivity is by changing the stoichiometry or chemical composition of the material where the ions come to rest and become embedded in the initially magnetic region.

The change in stoichiometry caused by implantation of ions is one way in which the magnetic moment density can be changed. If the implanting species is non-magnetic, the magnetic moment density can be decreased. In one embodiment, the ion species type, energy, duration, and doping rates of the first and second ion implantations are selected such that the original magnetic moment density (dM0) is greater than the first magnetic moment density (dM1) and the first magnetic moment density (dM1) is greater than the second magnetic moment density (dM2). In other words, the magnetic moment density of storage layer 402 may decrease from the magnetic domains 410 to the second region such that dM0>dM1>dM2. In one embodiment, the second coercivity (K2) may be approximately zero.

With K0>K1>K2 and dM0>dM1>dM2, where K2 and dM2 are approximately zero, magnetic separation between the magnetic domains 410 may be created. In one embodiment, the first region 406 provides exchange springs or nucleation aids for initiating reversal of the magnetic material of the magnetic domains 410.

Figure 4E:
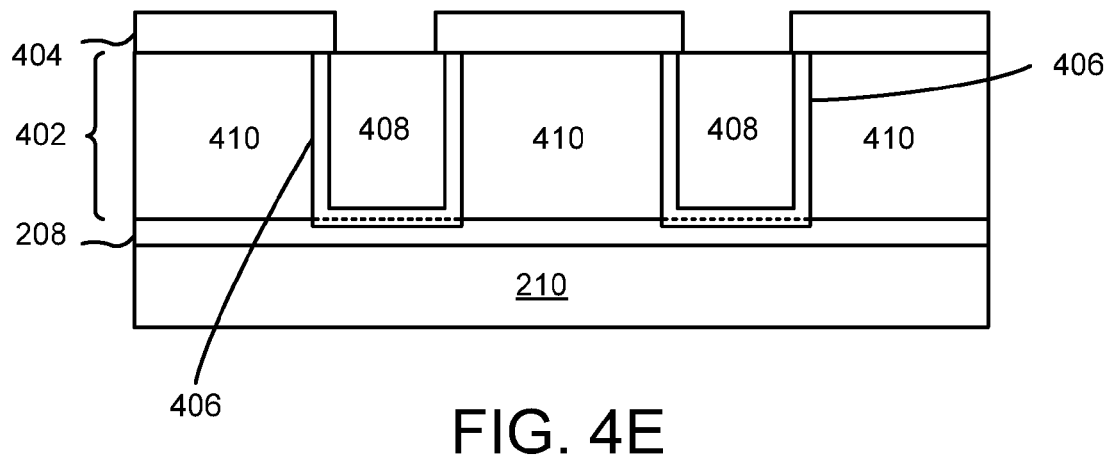

FIG. 4E illustrates a plurality of second regions 408 in which the second ion species has been implanted 310. The second regions 408 are shown wholly within the first region 406. In one embodiment, the second region 408 does not extend under the mask structure 404 as far as the first ion species 406. In other words, the characteristics of the second ions are selected such that the lateral straggle of the second implanted ions are less than the first implanted ions. Further, in one embodiment, the characteristics of the second ions are selected such that the second regions 408 do not extend as deep into the storage layer 402 and exchange bridge layer 208, if at all, as the first region 406.

Although the method 300 of FIG. 3 includes only first and second ion species implantation procedures 308, 310, in other embodiments, the method can include more than two implantation procedures to form additional non-magnetic regions wholly within the first and second regions created by the procedures 308, 310. In one embodiment, it may be desirable to include three or more implantation procedures to create a more uniform concentration of ions thru the thickness of the media. For example, it may be possible to achieve greater uniformity throughout a first region 406 or a second region 406 by performing three or more implantation procedures. In one embodiment, it may be desirable to use lower doses for lower energy implants and higher doses for higher energy implants. For example, some of the ions from a higher energy implant will be stopped close to the surface so a lower number of low energy ions, which tend to stop closer to the surface, are needed to match the concentration deeper in the material. Furthermore, in some embodiments, finer control of straggle and material composition may be achieved by implementing a larger number of doping conditions and regions.

Figure 4F:
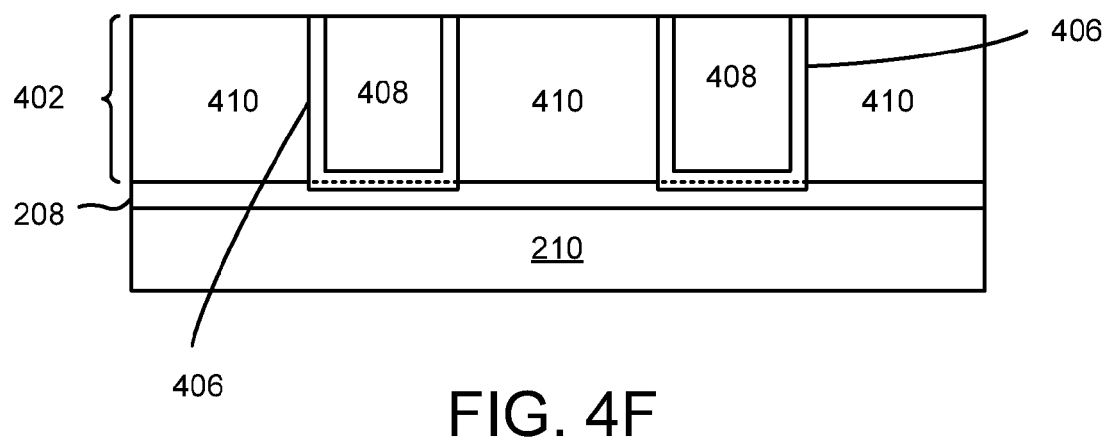

After concluding the ion species implantation procedures (e.g., after at least the first and second ion species are implanted 308, 310), the method 300 includes removing 312 the mask structure. In one embodiment, removing 312 the mask structure may include dissolving or etching away the mask structure 404 using a substance that reacts with the mask structure 404 but not the storage layer 402. For example, a spin on glass that makes up the mask structure 404 may react with a substance that does not react with the storage layer 402 material. FIG. 4F illustrates the storage layer 402 with the mask structure 404 removed 312. In one embodiment, after applying an overcoat or protective layer onto the now-exposed storage layer 402, and performing one or more smoothing or burnishing processes on the outer surface of the overcoat layer, the storage layer may then be used to store data.

In the above embodiments, a method 300 includes fabricating 304 a storage layer 402 of magnetic material. The method 300 also includes implanting 306, 308 ions within a portion of the storage layer 402 to reduce the magnetic properties (such as magnetic moment density and/or coercivity) of the implanted portions storage layer 402. Other embodiments are also possible where, rather than decreasing magnetic properties through implantation the magnetic properties may be increased. For example, in one embodiment, the storage layer 402 may be fabricated 304 of a non-magnetic or substantially non-magnetic material and one or more implantation steps 306, 308 may be performed which increase the magnetic properties (such as magnetic moment density and/or coercivity) of portions of the storage layer 402. For example, in one embodiment, regions 410 of the of FIG. 4F may have substantially non-magnetic properties while regions 406 and 408 have increased magnetic properties that result from one or more implantation steps. One of skill in the art will recognize other modifications and/or variations in light of the present disclosure.

Figures 5, 6:
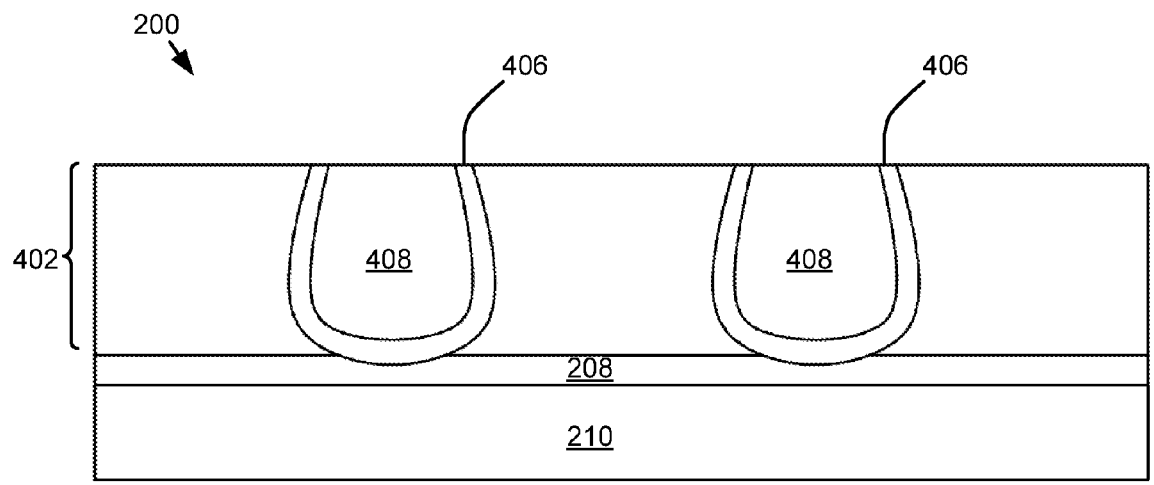
FIG. 5 is a table including longitudinal range values and radial straggle values for various ion species and implantation energies.
FIG. 6 is a cross-sectional side view of a storage medium illustrating an exemplary shape of relatively non-magnetic structures formed by ion implantation steps.

Turning to FIG. 5, an implantation table 500 is shown illustrating how regions of different shapes or sizes can be created through ion implantation. The table 500 illustrates the longitudinal range and radial straggle for a given species at a given energy level. For example, the table 500 includes an Antimony (Sb) and a Phosphorus (P) species. Antimony is listed with two different energies (5 keV and 15 keV) and longitudinal range and radial straggle corresponding to each energy. Using this table 500 a plurality of regions may be formed in a storage layer to tune magnetic properties of portions of the storage layer.

As is known in the art, the straggle depends on the mass of the implantation species in an inverse relation such that heavier species implant with lower straggle, while the depth of the implantation increases monotonously with the mass of the implantation species. Furthermore, as known to those skilled in the art, the straggle and implantation depth depend also on the energy of the implanted species with higher energies generally leading to more straggle and greater stopping depth. Accordingly, in one embodiment, these physical properties may be utilized in an implantation process to allow optimization of straggle. For instance, the elements listed in table 5 offer a large difference in mass since P has atomic weight 31.0, while Sb has atomic weight of 121.8. Other examples, in addition to the example listed in FIG. 5, include combinations of relatively heavy ions of elements that include, but are not limited to germanium, gallium, bismuth, krypton, xenon, tellurium, selenium, chromium, tantalum, or the like with relatively lighter ions of elements that include, but are not limited to, silicon, nitrogen, oxygen, neon, argon, fluorine, boron, hydrogen, helium, carbon, or the like.

In one embodiment, the vertical boundaries of region 408 are optimized by using the relatively heavier species of Sb to create the non-magnetic bottom portion of 408 of FIG. 4F, while the top portion of 408 is implanted with the relatively lighter species of P. The energy and doses used in the embodiment depend on the total thickness of 408, which may, in one embodiment, be in the range of 2-10 nm. Depending on thickness of the layer and the desired degree of quenching of the magnetic moment in the region 408, as well as on the ion species used, the dose of implanted ions may be in the range of 1 E 15 ions/cm2 to 4 E 16 ions/cm$^2$ with energies in the range of 2-15 keV. Detailed selection of the optimum dose and energy for each ion species may be carried out by using computer simulations, e.g. with the SRIM software, as is well known to those skilled in the art.

In a similar way, embodiments of exchange spring structures (e.g. 406) are produced, by selecting one or more of the quoted ion species, and adjusting dose and energy. Further aspects or properties of ion implantation may also affect longitudinal range and/or radial straggle. For example, in cases where the region being implanted does not become too hot during implanting, the longitudinal range and straggle may be relatively insensitive to the doping rate and implantation time. However, temperature, changes to the microstructure (e.g. crystalline to amorphous transformation), and changes to the composition (e.g. increased number of ions implanted in a local region) can affect the longitudinal range and radial straggle.

FIG. 6 is a cross-sectional side view of a storage medium 200 illustrating exemplary shapes of structures formed by ion implantation steps. The storage medium 200 includes an underlayer 210, an exchange bridge layer 208, and a storage layer 402. In one embodiment, each of the exchange bridge layer 208 and storage layer 402 may be fabricated by a deposition or other thin film fabrication step. The exchange bridge and storage layers 208, 402 are depicted having horizontal boundaries. The storage medium 200 also includes a first region 406 and a second region 408 contained within the first region. In one embodiment, the second region 408 is a non-magnetic region. In one embodiment, portions within the first region 406, but outside the second region 408 may form an exchange spring. The first region 406 and second region 408 are depicted having exemplary shapes resulting from ion implantation. For example, instead of including rectangular shaped boundaries, the boundaries are rounded to depict the actual shapes of the regions following ion implantation.

The magnetic storage media of FIGS. 2, 4F, and 6 share common structure including a single exchange bridge layer, a first ion implantation region extending at least partially into the exchange bridge layer, and a second ion implantation region within the first ion implantation region, but not extending into the exchange bridge layer. The exchange bridge layer 208 may be considered a homogenous exchange bridge layer because it is not completely interrupted by ion implantations. Other magnetic storage media with similar structures share the same or similar advantages as those described above. For example, FIGS. 7-11 depict respective exemplary magnetic storage media with structures similar to those describe above and formed with methods similar to the methods described above.

Figure 7:
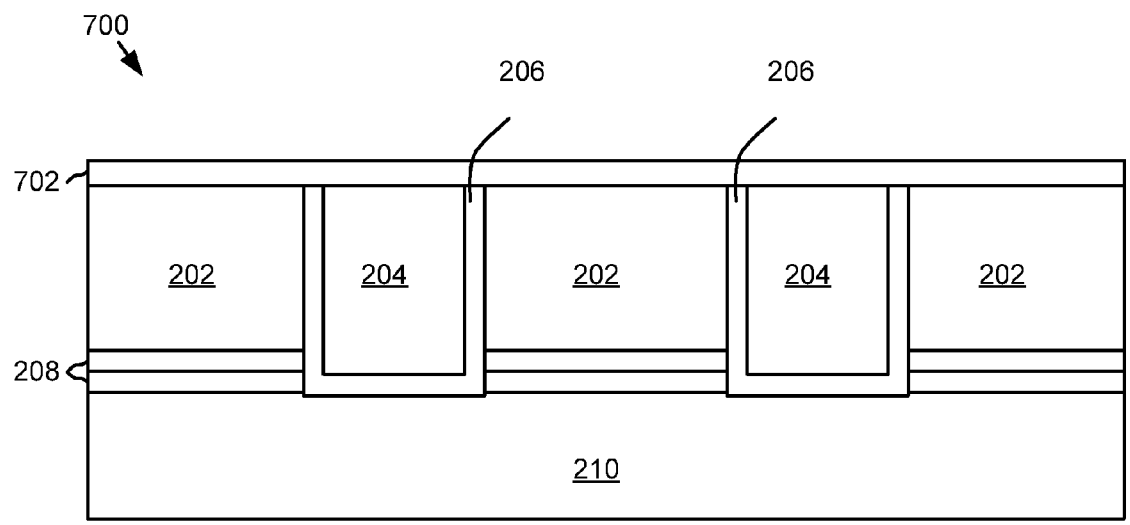
FIG. 7 is a schematic cross-sectional side view of a portion of a patterned magnetic storage medium that includes two exchange bridges and a protective overcoat according to one embodiment.

FIG. 7 is a schematic diagram illustrating an exemplary cross-sectional structure of a storage medium 700 that includes two exchange bridges 208A, 208B and a protective overcoat 702. Similar to the storage medium 200 of FIG. 2A, the storage medium 700 includes a number of magnetic domains 202, non-magnetic regions 204, exchange springs 206, and an underlayer 210. The exchange bridges 208 are non-homogenous exchange bridges in that the exchange springs 206 and/or non-magnetic regions 204 extend all the way into and/or past the exchange bridge layers 208. In one embodiment, the protective overcoat 702 serves to protect the magnetic domains 202 from damage.

Figure 8:
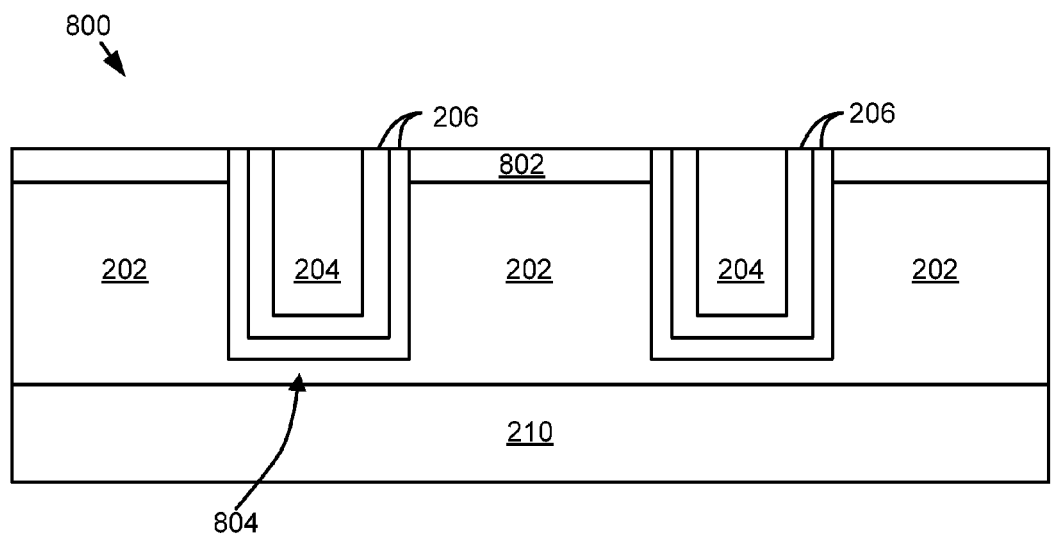
FIG. 8 is a schematic cross-sectional side view of a portion of a patterned magnetic storage medium that includes an upper cap layer and a two-layer exchange spring, two exchange bridges and a protective overcoat according to one embodiment.

FIG. 8 is a schematic diagram illustrating an exemplary cross-sectional structure of a storage medium 800. The storage medium 800 includes an upper cap layer 802 and a two-layer exchange spring 206. In the depicted embodiment, the exchange springs 206 do not extend into an underlayer 210. In one embodiment, because the exchange springs 206 do not extend into the underlayer 210, a connecting portion 804 of material of a storage layer may act as an exchange bridge.

In one embodiment, the benefit of multiple or graded exchange springs may include higher exchange spring gains. For example, the magnetic domain material may have a relatively higher coercivity and may still be switchable. In some embodiments, there may be 3 or 4 layers. In some embodiments, there may be as many layers as can practically fit in the available space.

Figure 9A:
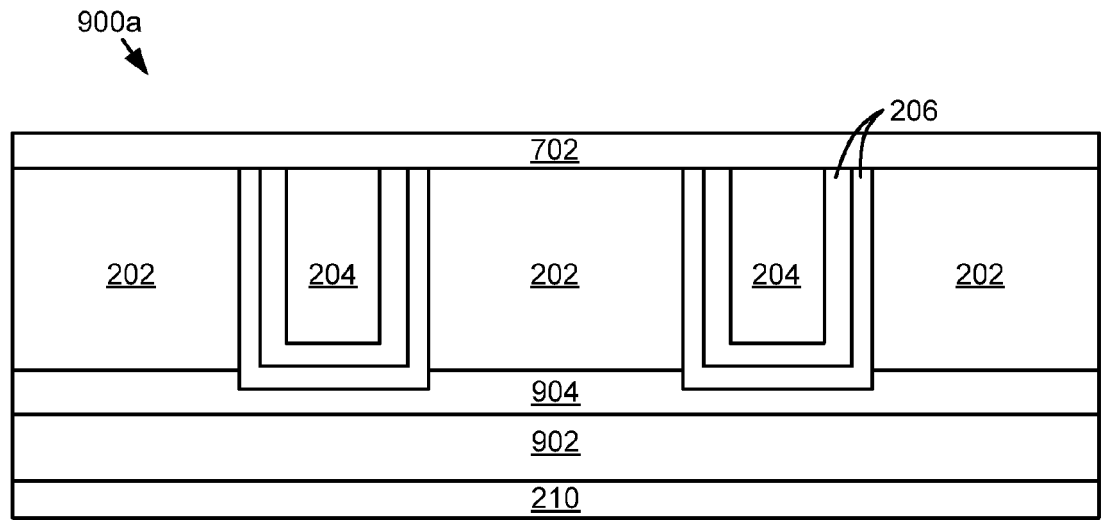
FIG. 9 is a schematic cross-sectional side view of a portion of a patterned magnetic storage medium that includes a soft underlayer according to one embodiment.

FIG. 9A is a schematic diagram illustrating an exemplary cross-sectional structure of a storage medium 900a. The storage medium 900a includes a soft underlayer 902, and an exchange-break 904 layer disposed on top of the soft-underlayer. The exchange-break layer 904 serves to suppress or control the exchange coupling between magnetic domains 202 that results from the soft underlayer. In one embodiment, the exchange-break layer 904 may be comprised, for example, of Ru and be of 0.5-2 nm in thickness, if partial exchange transmission is desired. In another embodiment, the exchange-break layer 904 may be comprised of Ru with a thickness in the range of 250 nm, if relatively complete suppression of exchange coupling via the soft underlayer is desired. Other variations on the material and thickness of the exchange-break layer 904 within the scope of the present disclosure will be recognized by those skilled in the art. The storage medium 900a also includes a two layer exchange spring 206 and a protective overcoat 702.

Figure 9B:
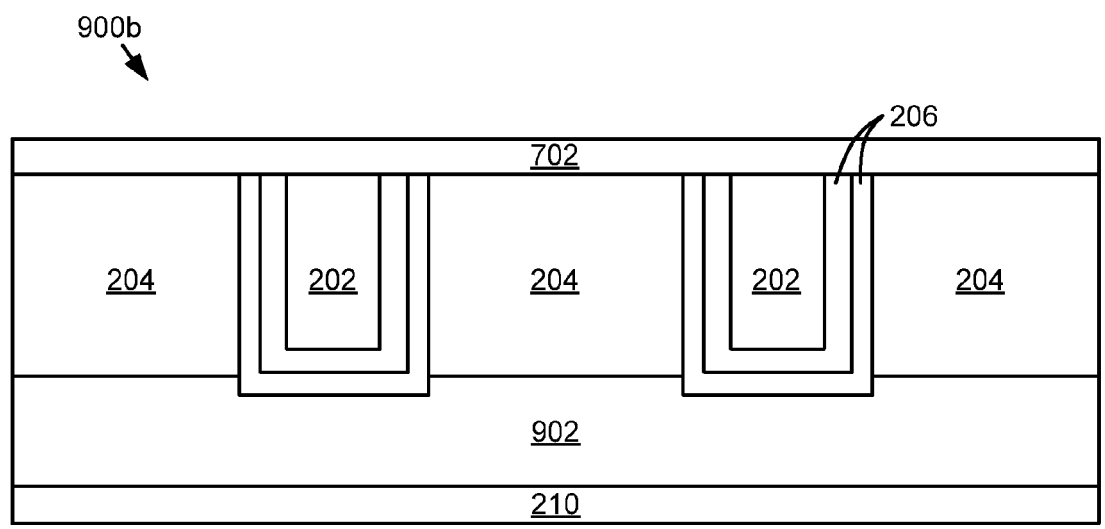
Figure 10:
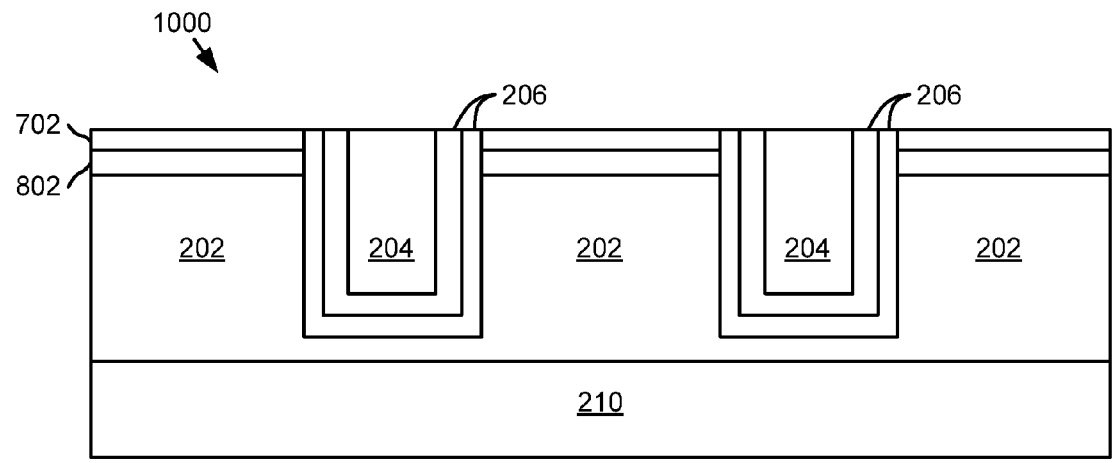
FIG. 10 is a schematic cross-sectional side view of a portion of a patterned magnetic storage medium that includes exchange springs that extend through an upper cap layer and a protective overcoat according to one embodiment.

FIG. 9B is a schematic diagram illustrating an exemplary cross-sectional structure of a storage medium 900b similar to that FIG. 9A. However, the relative position of the magnetic domains 202 and the non-magnetic domains 204 has been reversed. The structure of the storage medium 900b may be formed, for example by starting with a non-magnetic storage layer and implanting ions to increase magnetic properties of portions of the non-magnetic storage layer to form the magnetic domains 202 and the exchange springs 206. Additionally, the storage medium 900b does not include an exchange-break layer 904. For example, there may be no need to further reduce exchange coupling between magnetic regions 202, because the exchange coupling between the regions 202 is governed by the exchange-springs 206 FIG. 10 is a schematic diagram illustrating an exemplary cross-sectional structure of a storage medium 1000. The storage medium 1000 includes an upper cap layer 802 and a protective overcoat 702. The non magnetic regions 204 and the exchange spring 206 layers are shown extending through the protective overcoat 702 and the upper cap layer 802. In one embodiment, the structure of the storage medium 1000 may be formed through two or more ion implantations through an upper cap layer 802 and a protective overcoat 702 layer.

Figure 11:
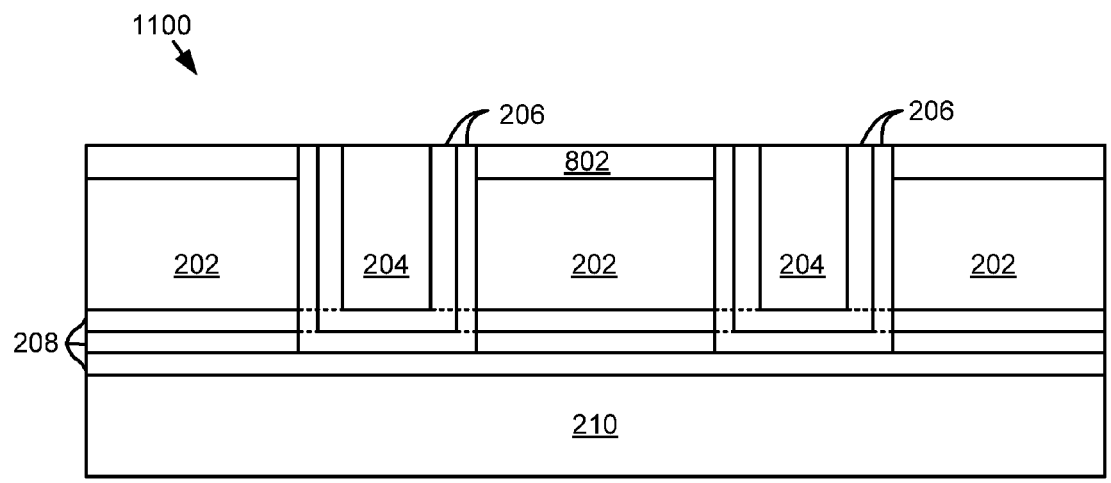
FIG. 11 is a schematic cross-sectional side view of a portion of a patterned magnetic storage medium that includes an upper cap layer and a three-layer exchange bridge according to one embodiment.

FIG. 11 is a schematic diagram illustrating an exemplary cross-sectional structure of a storage medium 1100 that includes three exchange bridges 208. The storage medium 1100 includes an upper cap layer 802. The exchange spring 206 layers are shown extending through the upper cap layer 802. The exchange springs 206 are also shown extending into two of the exchange bridge layers 208 while not extending into the third exchange bride layer 208. In the depicted embodiment, two of the exchange bridge layers 208 are non-homogenous exchange bridges while one is a homogenous exchange bridge. In one embodiment, the structure of the storage medium 1100 may be formed through three ion implantations.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A magnetic storage medium, comprising:
    a magnetic domain comprising a first magnetic material having a first coercivity and a first magnetic moment density;
    a substantially non-magnetic region laterally adjacent to the magnetic domain; and
    an exchange spring structure surrounding sides of the magnetic domain, surrounding sides of the substantially non-magnetic region, and surrounding a bottom of the substantially non-magnetic region, the exchange spring structure being disposed between the magnetic domain and the non-magnetic region, wherein the exchange spring structure comprises a second magnetic material having a second coercivity and a second magnetic moment density, wherein the second coercivity is lower than the first coercivity, the second magnetic moment density is lower than the first magnetic moment density, or the second coercivity is lower than the first coercivity and the second magnetic moment density is lower than the first magnetic moment density.

2. The magnetic storage media of claim 1, wherein the exchange spring structure comprises a vertical portion.

3. The magnetic storage media of claim 1, wherein the exchange spring structure separates the magnetic domain from substantially any portion of the non-magnetic region.

4. The patterned magnetic storage media of claim 1, wherein the magnetic domain and the non-magnetic region are formed substantially in a planar storage layer.

5. The magnetic storage media of claim 4, wherein the exchange spring structure extends into the planar storage layer in a direction perpendicular to a surface of the planar storage layer.

6. The magnetic storage media of claim 5, wherein the exchange spring structure comprises a substantially U-shaped cross-section.

7. The magnetic storage media of claim 1, further comprising an exchange bridge, the exchange bridge comprising a magnetic material that extends between the magnetic domain and one or more additional magnetic domains.

8. The magnetic storage media of claim 7, wherein the exchange bridge comprises a homogenous exchange bridge layer.

9. The magnetic storage media of claim 7, wherein the exchange bridge comprises a non-uniform exchange bridge layer.

10. The magnetic storage media of claim 9, wherein at least a portion of the exchange spring structure extends into the non-uniform exchange bridge layer.

11. The magnetic storage media of claim 1, further comprising a plurality of exchange bridges, each exchange bridge comprising a magnetic material that extends between the magnetic domain and one or more additional magnetic domains.

12. The magnetic storage media of claim 1, wherein the magnetic domain comprises a perpendicular magnetic storage material.

13. The magnetic storage media of claim 1, wherein the magnetic domain comprises a parallel magnetic storage material.

14. The magnetic storage media of claim 1, wherein the magnetic domain is comprised in a magnetoresistive random-access memory (MRAM) bit.

15. A magnetic disk drive system comprising:
    a controller module;
    a suspension arm;
    a read/write head; and
    a magnetic storage disk, the magnetic storage disk comprising a planar storage layer, the planar storage layer comprising a magnetic domain comprising a first magnetic material having a first coercivity and a first magnetic moment density, a substantially non-magnetic region laterally adjacent to the magnetic domain, and an exchange spring structure disposed between the magnetic domain and the non-magnetic region, the exchange spring structure being directly adjacent the substantially non-magnetic region and surrounding sides and a bottom of the substantially non-magnetic region, wherein the exchange spring structure comprises a second magnetic material having a second coercivity and a second magnetic moment density, wherein the second coercivity is lower than the first coercivity, the second magnetic moment density is lower than the first magnetic moment density, or the second coercivity is lower than the first coercivity and the second magnetic moment density is lower than the first magnetic moment density.

* * * * *